No. 855,686. PATENTED JUNE 4, 1907.
G. W. BACON.
HORSE HAY RAKE.
APPLICATION FILED JUNE 5, 1906.
2 SHEETS—SHEET 1.
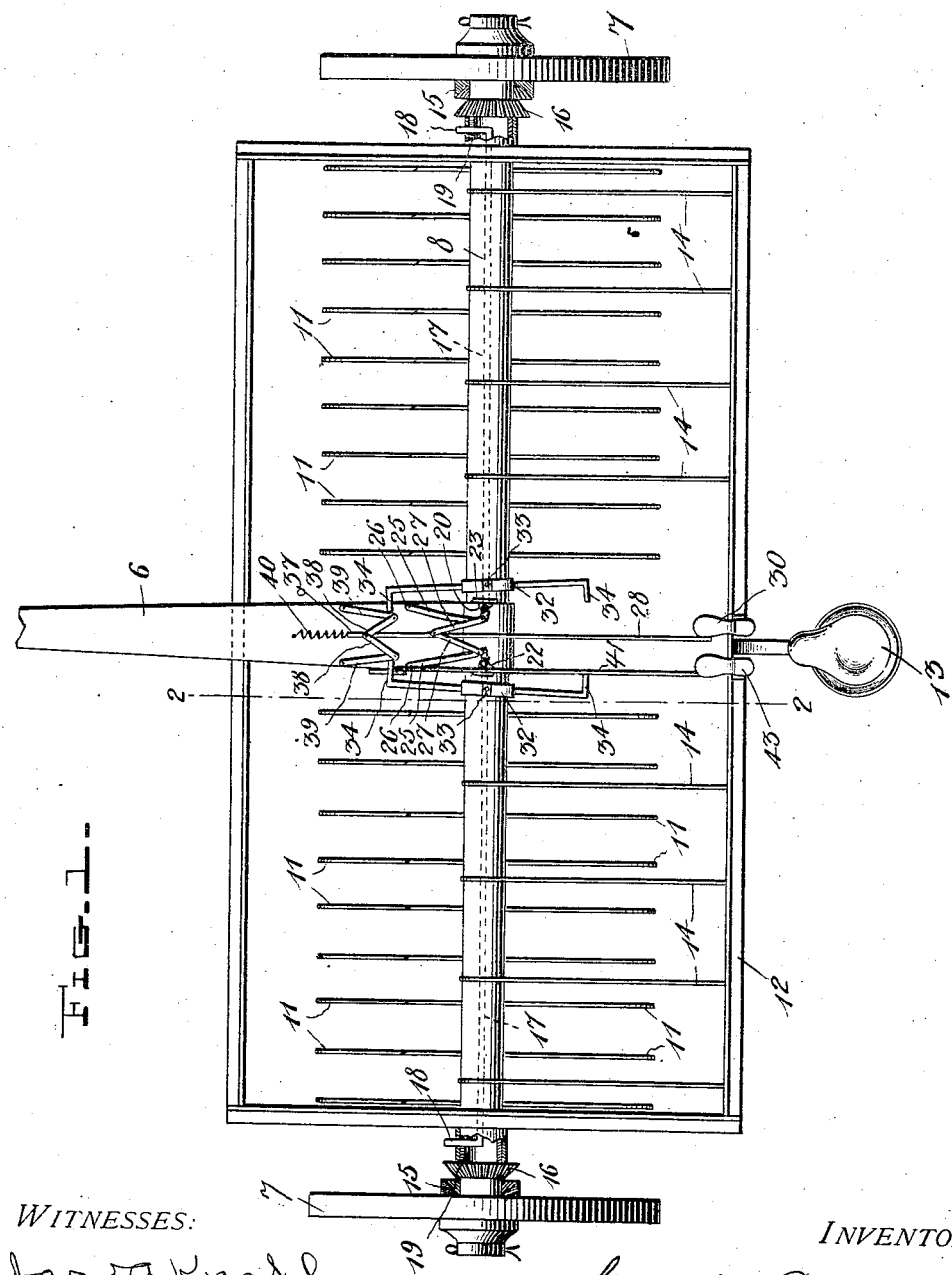
WITNESSES:
INVENTOR
George W. Bacon,
BY
Milo B. Stevens & Co.
Attorneys.

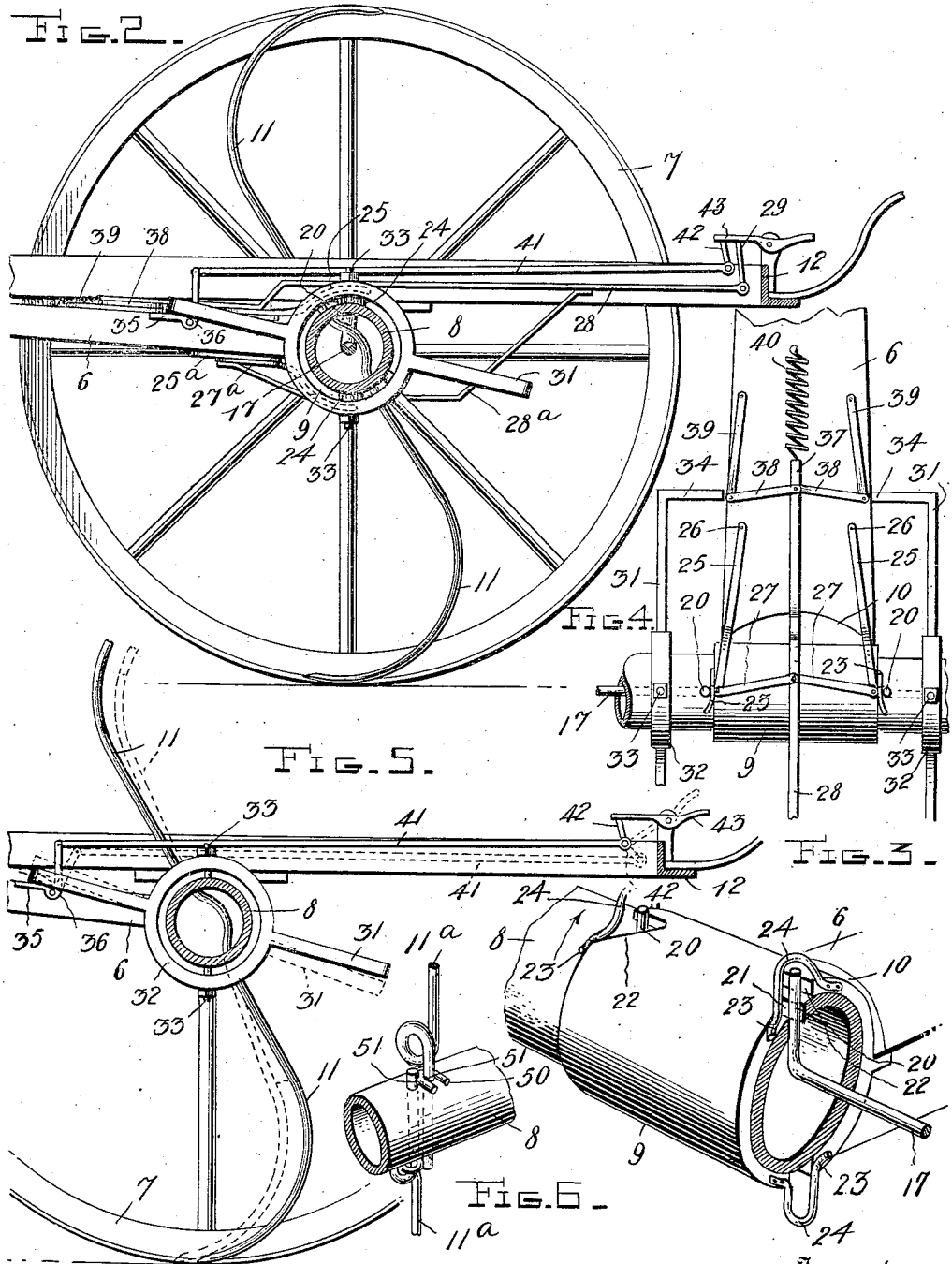

UNITED STATES PATENT OFFICE.

GEORGE W. BACON, OF GRAND JUNCTION, COLORADO.

HORSE HAY-RAKE.

No. 855,686.   Specification of Letters Patent.   Patented June 4, 1907.

Application filed June 5, 1906. Serial No. 320,277.

*To all whom it may concern:*

Be it known that I, GEORGE W. BACON, a citizen of the United States, residing at Grand Junction, in the county of Mesa and State of Colorado, have invented new and useful Improvements in Horse Hay-Rakes, of which the following is a specification.

This invention is a revolving horse rake of the flop-over type, in which the axle carries two sets of teeth diametrically opposite to each other which are alternately dumped and thrown into operative position by a half turn of the axle.

The object of the invention is to produce an improved machine of this kind, characterized particularly by improved means for controlling the turn or dump of the rake and for varying the pressure of the rake teeth on the ground.

Further objects and advantages will appear from the detailed description following.

In the accompanying drawings, Figure 1 is a top plan view of the rake. Fig. 2 is a vertical section on the line 2—2 of Fig. 1. Fig. 3 is a detail in perspective of a band connected to the rear end of the tongue and extending around the axle at the middle thereof and having notches which catch the ends of the rods which control the engagement of the clutches with the hubs. Fig. 4 is an enlarged detail in plan showing the position of the parts when the pawls which stop the revolution of the rake are released. Fig. 5 is a detail in section and side elevation showing the manner in which the tension or pressure of the rake teeth on the ground is adjusted. Fig. 6 is a detail in perspective showing a modification of the spring teeth.

Referring specifically to the drawings, 6 indicates the tongue of the rake, and 7 the wheels loosely mounted on a tubular axle 8. The tongue is connected at its rear end to the middle of the axle by means of a cuff 9 which is bolted to the tongue by means of its flange 10, and which extends around the axle. The two sets of teeth are indicated at 11 and they are preferably formed of continuous wires extending through the axle, so that each wire makes two teeth. A frame 12, preferably made of angle iron, is mounted upon the axle 8 and connected to the tongue 6. The axle is free to turn in bearings under this frame, and on the rear bar of the frame is mounted a seat 13, which counter-balances the tongue. Rods 14 are connected to the rear bar and extend forwardly to the axle, and are looped around the same, and serve to clear the rake when it is dumped.

The hubs of the wheels are formed with female clutch members 15 with which are adapted to couple the male clutch members 16 which latter are slidably mounted upon the ends of the tubular axle adjacent the hubs, and are capable of being moved in or out for engagement or disengagement. This movement is effected by means of rods 17 which extend lengthwise through the axle and are connected at their outer ends to the members 16 of the clutches by means of projections 18 at their outer ends which extend through slots 19 in the axle. The inner ends of these rods extend to the middle of the axle and have lateral projections 20 which extend through slots 21 in the axle.

At each end the cuff 9 is provided with diametrically opposite notches 22, and the projections 20 and slots 21 are so positioned that the said projections, extending through said slots, are in proper position to engage in the notches 22, and they are normally thrown into such engagement by means of curved springs 3 which project at an inclination in advance of the notches so that when the axle turns the projections 20 are caught by the springs and thrown into the notches. Opposite the notches, however, the springs are offset as at 24 so that the projections may be thrown out of the notches when desired.

The rods 17 are movable lengthwise to engage or disengage the clutches, and are normally drawn and held in by means of the springs 23 and the notches just described. The means for throwing out the rods and engaging the clutches consist of levers 25 which are pivoted at 26 upon the tongue, at one end, and connected at the other ends by links 27 to a rod 28 connected to a crank arm 29 projecting from a right pedal 30 pivotally mounted upon the rear bar of the frame 12, under the seat. The rear ends of the levers 25 are located between or beside the projections 20 on the rods 17. When the pedal is tilted the connecting rod 28 and links 27 cause the rear ends of the levers 25 to spread and throw the projections 20 out of the notches 22, thereby shifting the rods 17 outwardly and throwing the clutch member 16 into engagement with the co-operating member 15, thereby turning the axle and dumping the rake.

Inasmuch as the projections 20 engage in the notches 22 twice for each revolution, that is, once in the notches on the upper side of the cuff and once in the notches on the lower side of the cuff, a duplicate of the lever mechanism just described is located on the under side of the tongue, the levers being indicated at 25ª connected by links 27ª to a branch rod 28ª extending from the rod 28 to the under side of the tongue. These levers act the same way as the upper levers, above described.

To prevent the axle and rakes from turning except when so operated, and to stop the turn after each dump or half revolution, means are provided as follows: 31 indicate a pair of double-ended pawls which have rings 32 at the middle through which the axle extends, and these pawls are pivoted to the axle by means of bolts 33. The pawls are located beyond the ends of the cuff 9 and are mounted to swing sidewise on their pivots 33. At the ends the pawls have inwardly-extending projections 34 which are arranged to strike and rest upon the top of the tongue 6, or rather upon the arms 35 of a bell crank lever 36 pivoted upon the tongue. When these pawls are in engagement with the tongue, the axle cannot turn.

In order to disengage the pawls simultaneously with the engagement of the clutches, the rod 28 is extended as at 37 and connected by links 38 to levers 39 pivoted upon the tongue and similar in construction and operation to the levers 25. These levers 39 are so positioned that when the rod 28 is pulled the levers spread and strike the ends 34 of the pawls and throw the same sidewise beyond the tongue so that the pawls will pass the tongue when the axle begins to turn. By the same action the opposite ends of the pawls are thrown toward each other in position to strike the tongue at the completion of the half turn or dump. A spring 40 returns the parts as soon as the pedal is released.

The pawls are so set that they strike the tongue when the rake teeth reach the ground, and the teeth are thus held in contact with the ground at ordinarily sufficient pressure. Occasionally it is desirable to increase the pressure, to hold the teeth down, and this is effected by the following means: as stated, the pawls when in engagement with the tongue rest upon the arms 35 of a bell crank lever 36 upon the upper surface of said tongue. The other arm of this bell crank lever is connected by means of a rod 41 to the crank arm 42 of the left pedal 43 under the seat. When this left pedal is tilted it pulls the rod 41 and turns the bell crank lever 36 so that its arm 35 lifts and raises the front ends of the pawls 31, which turns the axle backward to that extent and consequently increases the pressure of the teeth against the ground accordingly, and the teeth will be held at such pressure until the pedal is released.

In the operation of the rake, the pawls hold the rake to the ground until the windrow is gathered. Then, to dump the rake and flop the other side over, the right pedal 30 is tilted thereby engaging the clutches and releasing the pawls 31. The wheels then turn the rake and it continues to turn until the springs 23 throw the projections 20 into the notches 22 thereby disengaging the clutches, at which instant the other ends of the pawls 31 come down upon the tongue and stop the turn of the rake until the next operation.

Instead of being formed of continuous wires, the opposite teeth may be formed of separate pieces of wire, as shown at 11ª, Fig. 6, the butts of which extend through holes in the axle 8, and held in place by staples 50, which extend through notches 51 in the adjacent teeth on opposite sides of the axle. This forms a simple and efficient manner of holding the teeth.

I claim:

1. In a revolving rake, the combination of a hollow axle, wheels and rake teeth thereon, clutches between the axle and wheels, and means, having connections extending through the axle, to open the clutches.

2. In a horse rake of the revolving flopover type, the combination with an axle carrying the rake teeth and means to intermittently turn the axle, of a tongue connected to the axle, pawls carried by the axle and engageable with the tongue to stop the turn of the axle, and means to operate the pawls.

3. In a horse rake of the revolving flopover type, the combination with an axle carrying opposite sets of rake teeth, and means to intermittently turn the axle, of a tongue connected to the axle, double-ended pawls pivoted to the axle and engageable at either end with the tongue to stop turn of the axle, and means to operate the pawls.

4. In a horse rake of the revolving flopover type, the combination with wheels, and an axle carrying opposite sets of teeth, of a clutch between the axle and a wheel, engageable to turn the axle, releasable means to prevent turn of the axle, and means to simultaneously operate the clutch and said releasable means.

5. In a horse rake of the revolving flopover type, the combination with wheels, and an axle carrying opposite sets of teeth, of a clutch between the axle and wheel, a tongue connected to the axle, a pawl pivoted on the axle and normally engaged with the tongue to stop the turning of the axle, and means to simultaneously engage the clutch and release the pawl.

6. In a horse rake of the revolving flopover type, the combination with wheels, and an axle carrying rake teeth, of a clutch between the axle and a wheel, a rod connected at its outer end to the clutch, to operate the same, and having at its inner end a projection extending through a slot in the axle, a cuff on the axle, connected to the tongue, and having a notch in which the projection is normally engaged, means to shift the rod lengthwise, to engage the clutch and release the projection from the notch.

7. In a horse rake of the revolving flopover type, the combination with a turning axle carrying teeth, and means to normally stop the turn of the axle when the teeth are in contact with the ground, of means to turn back the axle to a limited extent, to increase the pressure of the teeth on the ground.

8. In a horse rake of the revolving flopover type, the combination with a turning axle carrying teeth, a pawl carried by the axle, a tongue connected to the axle and with which the pawl is normally engaged to stop the forward turn of the axle when the teeth are in contact with the ground, of means to force back the pawl and thereby turn back the axle, to increase the pressure of the teeth on the ground.

9. In a horse rake of the revolving flopover type, the combination with a turning axle carrying teeth, a tongue connected to the axle, a lever upon the tongue, a pawl carried by the axle and arranged to strike the lever, to stop the forward turn of the axle when the teeth are in contact with the ground, and means to turn the lever, to force back the pawl and thereby reverse the axle to a limited extent, to increase the pressure of the teeth on the ground.

10. In a horse rake of the revolving flopover type, the combination with wheels, and an axle carrying opposite sets of rake teeth, and having slots at the ends and in the middle of clutches on the outer ends of the axle and movable to engagement with the wheels, to turn the axle, rods extending lengthwise through the axle and connected through the slots at the outer ends with the clutches, and having projections extending through the slots at the middle, and means engageable with said projections to shift the rods in or out and thereby release or engage the clutches.

In testimony whereof I have signed my name to this specification in the presence of two subscribing witnesses.

GEORGE W. BACON.

Witnesses:
JAMES A. JOHNSON,
LEO J. KROHN.